United States Patent
Chang et al.

(10) Patent No.: US 10,891,646 B2
(45) Date of Patent: *Jan. 12, 2021

(54) LOCATING A NETWORK CABLE CONNECTOR

(71) Applicant: International Business Machines Corporation, Armonk, NY (US)

(72) Inventors: Chun-Fei Chang, New Taipei (TW); Ming Da Ho, Taipei (TW); Ming-Pin Hsueh, New Taipei (TW); Ya Hsuan Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,120

(22) Filed: Jan. 31, 2019

(65) Prior Publication Data
US 2019/0188746 A1 Jun. 20, 2019

Related U.S. Application Data

(63) Continuation of application No. 14/553,068, filed on Nov. 25, 2014, now Pat. No. 10,277,467.

(30) Foreign Application Priority Data

Nov. 29, 2013 (TW) .............................. 102143964 A

(51) Int. Cl.
*H04L 12/24* (2006.01)
*G06Q 30/02* (2012.01)
*H04L 12/26* (2006.01)

(52) U.S. Cl.
CPC ......... *G06Q 30/0223* (2013.01); *H04L 41/12* (2013.01); *H04L 43/10* (2013.01)

(58) Field of Classification Search
CPC ................................ H04L 41/12; H04L 43/10
(Continued)

(56) References Cited

U.S. PATENT DOCUMENTS 6,570,974 B1  5/2003  Gerszberg
6,965,577 B1  11/2005  Murphy
(Continued)

FOREIGN PATENT DOCUMENTS

TW    201201533 A1   1/2012
TW    201308953 A1   2/2013
WO    2009024114 A1  2/2009

OTHER PUBLICATIONS

Anonymous, "LED Smarter Cable Indicators," IP.com, 000220127, Jul. 23, 2012, pp. 1-2.
(Continued)

*Primary Examiner* — Igor N Borissov
(74) *Attorney, Agent, or Firm* — Law Office of Jim Boice

(57) ABSTRACT

A method of locating one or more endpoint connectors of a network cable wherein the network cable includes a first endpoint connector and a second endpoint connector comprises: one or more processors capturing an incoming packet carrying therein a specific identifier, wherein the specific identifier is a specific bit string that has been predefined to trigger an activation of one or more indicating devices located on one or more endpoint connectors on the network cable; determining that the incoming packet carries therein the specific identifier; and in response to determining that the incoming packet carries therein the specific identifier, triggering an activation of a first indicating device indicative of a location of the first endpoint connector.

20 Claims, 4 Drawing Sheets

(58) Field of Classification Search
USPC ...................................... 370/241, 241.1, 242
See application file for complete search history.

(56) References Cited

U.S. PATENT DOCUMENTS

| | | | |
|---|---|---|---|
| 6,975,242 | B2 | 12/2005 | Dannenmann |
| 7,019,658 | B1 | 3/2006 | Erickson et al. |
| 7,049,937 | B1 | 5/2006 | Zweig et al. |
| 7,327,278 | B2 | 2/2008 | Dannenmann et al. |
| 8,045,486 | B2 | 10/2011 | Swan |
| 8,351,747 | B1 | 1/2013 | Aybay |
| 8,382,511 | B2 | 2/2013 | Caveney et al. |
| 8,758,982 | B1 | 6/2014 | Choi |
| 2003/0222786 | A1 | 12/2003 | Dannenmann |
| 2006/0239196 | A1 | 10/2006 | Khanna |
| 2007/0274177 | A1 | 11/2007 | Ide |
| 2008/0028234 | A1 | 1/2008 | Ducharme |
| 2008/0080507 | A1 | 4/2008 | Swallow |
| 2009/0210932 | A1 | 8/2009 | Balakrishnan et al. |
| 2010/0315942 | A1* | 12/2010 | Jackson .............. H04L 12/4625 370/216 |
| 2011/0034068 | A1 | 2/2011 | Russell |
| 2012/0013468 | A1 | 1/2012 | Olah |
| 2012/0050062 | A1 | 3/2012 | Archibald et al. |
| 2012/0156923 | A1 | 6/2012 | Gao |
| 2012/0163368 | A1 | 6/2012 | Battig |
| 2012/0270436 | A1 | 10/2012 | Blythe |
| 2013/0138839 | A1 | 5/2013 | Abuelsaad et al. |
| 2013/0336165 | A1 | 12/2013 | Wakumoto |
| 2014/0195666 | A1 | 7/2014 | Dumitriu |

OTHER PUBLICATIONS

A. McReynolds et al., "Real Time Tracking of Optical Cabling using RFID," Hewlett-Packard Development Company, L.P., White Paper, Sep. 10, 2007, pp. 1-5.

Anonymous, "TCPDump & LibPCAP", www.tcpdump.org, retrieved Nov. 25, 2014, pp. 1-3.

J. Rodriguez et al, "IBM Websphere DataPower SOA Appliances Part IV: Management and Governance", Apr. 23, 2008, p. 1-148, IBM Redbooks, IBM Corporation.

D. Anderson et al., "WebSphere Everyplace Connection Manager: Increasing Mobile Security, Reducing Wireless Costs", IBM Corporation, White Paper, Jul. 2004, pp. 1-15.

A. Jones et al., "IBM SmartCloud Enterprise Tip: Build Multiple VPNs and VLANs", IBM Corporation, DeveloperWorks, Feb. 6, 2012, pp. 1-13.

A. Jones et al., "IBM SmartCloud Enterprise Tip: Span Virtual Local Area Networks", IBM Corporation, DeveloperWorks, Sep. 16, 2011, pp. 1-5.

Anonymous, "Raspberry Pi", Wikimedia Foundation, Inc., wikipedia.org, retrieved Nov. 25, 2014, pp. 1-13.

G. Combs et al., "Wireshark: About", www.wireshark.org, retrieved Nov. 25, 2014, pp. 1-26.

* cited by examiner

LOCATING A NETWORK CABLE CONNECTOR

BACKGROUND

The present invention relates to methods and devices of locating two endpoint connectors (such as RJ45) of a network cable, and more particularly, to a cable built-in with the function of locating two endpoint connectors of a network cable.

FIG. 1 is a schematic view of a conventional intranet. By an external network 103, a user of external endpoint 101 logs in to an enterprise-oriented network linking device 106 functioning as a demilitarized zone (DMZ) 105. The network linking device 106 is adapted to control the direction of the flow of network packets and thus comes in the form of an exchanger, a bridge, or a router. Conventional network security apparatuses, such as a firewall, an intrusion detection system (IDS), and an intrusion prevention system (IPS), can be disposed in the DMZ 105 and coupled to the network linking device 106. For the framework of the network linking device 106, refer to Cisco's exchanger products, such as Cisco Catalyst 3550 Series Switch. An internal network resource 107 is not restricted to specific appliances or servers. The internal network resource 107 comprises a plurality of appliances, servers, or a combination thereof, whose quantity is not restrictive of the prior art. For example, the internal network resource 107 represents a local area network (LAN). Appliances, which are also known as Internet appliances, are built-in with networking capability and comprise devices with a specific function. Unlike general-purpose computer devices, appliances are designed in accordance with specific purposes or specific services in order to perform specific transactions and thus are highly efficient.

The internal network resource 107 is a virtual local area network (VLAN). Given internal resources of an enterprise or organization, a network engineer can perform logical grouping of the appliances in different physical LANs by VLAN technology to provide complete information security.

To ensure the security of its internal data, an enterprise or organization typically adopts a virtual private network (VPN) and thus provides a virtual private network server in the DMZ 105 whereby a user accesses internal resources by an external connection. The virtual private network server is coupled to the network linking device 106. The user of the external endpoints 101 has to log in to the virtual private network server; then, after the user has been authenticated and licensed, the virtual private network server gets linked to the network linking device 106 through the VPN. In some embodiments, the virtual private network server is not required, and thus the user of the external endpoints 101 does not necessarily rely upon the VPN in order to link the network linking device 106 to the internal network resource 107. The other hardware components (not shown) and software components (not shown) (such as an additional computer system, router, firewall) can be disposed in the external network 103 disposed between the virtual private network server (or the network linking device 106) and the external endpoints 101.

To ensure the security of its internal data and the security of network communication, an enterprise or organization typically provides network security policies, for example, security apparatus, such as a firewall, an antivirus software, an intrusion detection system (IDS), or an intrusion prevention system (IPS), at an internal endpoint linked to an intranet. The internal endpoint is a host computer (such as a router, a workstation, or a server) or a data circuit-terminating equipment (DCE) (such as a bridge or an exchanger).

It is usually intricate to effectuate the wiring of cables in a network environment nowadays. Due to the complexity of network environments, network cable management is the most difficult and complicated issue which confronts administrators. When a user moves or a network appliance is to be upgraded or changed, the administrators usually discover that network cables are entangled together and thus find it difficult to manage the actual locations of cable endpoints and network appliances. It is likely that a network cable is also linked to two network ports located at different racks, different rooms, different stories, or even different buildings. When a cable is inserted into a network port on a network appliance, it is difficult for the administrators to identify the whereabouts of the other end of the cable. A packet is likely to get lost when its journey covers different networks, different stories, or even different buildings, because it involves different network appliances (such as routers or exchangers.) Therefore, it is difficult for the administrators to find the linked network appliances disposed at the other end of the cable. Hence, it is usually a tough job to locate two endpoint connectors of a network cable.

A conventional solution entails attaching tags to two endpoint connectors of a network cable, respectively. However, the solution based on the paired tags fails to solve existing problems. For example, assumed that there are 10 racks in a server room and the racks each comprise 20 machines. If the administrator wants to find another related endpoint connector of a cable linked to a specific network port, the administrator can only check an endpoint tag of every cable manually until the administrator finds the endpoint connectors of cables with identical tags.

Accordingly, it is advantageous to provide a simple and effective solution of locating two endpoint connectors of a network cable.

SUMMARY

In an embodiment of the present invention, a method of locating endpoint connectors of a network cable comprises: capturing an incoming packet carrying therein a specific identifier from an echo request instruction; determining whether the incoming packet carries therein the specific identifier; and in response to determining that the incoming packet received carries therein the specific identifier, triggering an indicating device indicative of locations of endpoint connectors of a network cable.

In an embodiment of the present invention, a computer program product locates endpoint connectors of a network cable, the computer program product comprising a computer readable storage medium having program code embodied therewith, wherein the computer readable storage medium is not a transitory signal per se, and wherein the program code is readable and executable by a processor to perform a method comprising: capturing an incoming packet carrying therein a specific identifier from an echo request instruction; determining whether the incoming packet carries therein the specific identifier; and in response to determining that the incoming packet received carries therein the specific identifier, triggering an indicating device indicative of locations of endpoint connectors of a network cable.

In an embodiment of the present invention, a hardware device for locating endpoint connectors of a network cable comprises: a packet capturing hardware device, wherein the packet capturing hardware device captures an incoming packet carrying therein a specific identifier from an echo request instruction; a packet examination logic for determining whether the incoming packet carries therein the specific identifier; and an indicating device for, in response to determining that the incoming packet received carries therein the specific identifier, indicating locations of endpoint connectors of a network cable.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
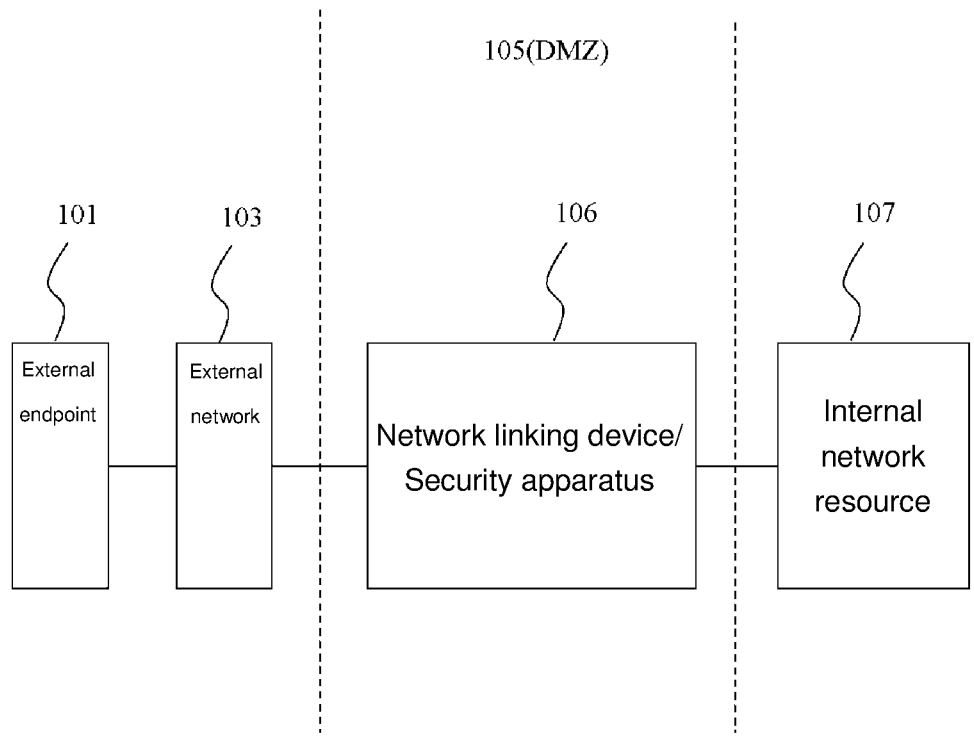
FIG. 1 is a schematic view of a conventional intranet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 3:
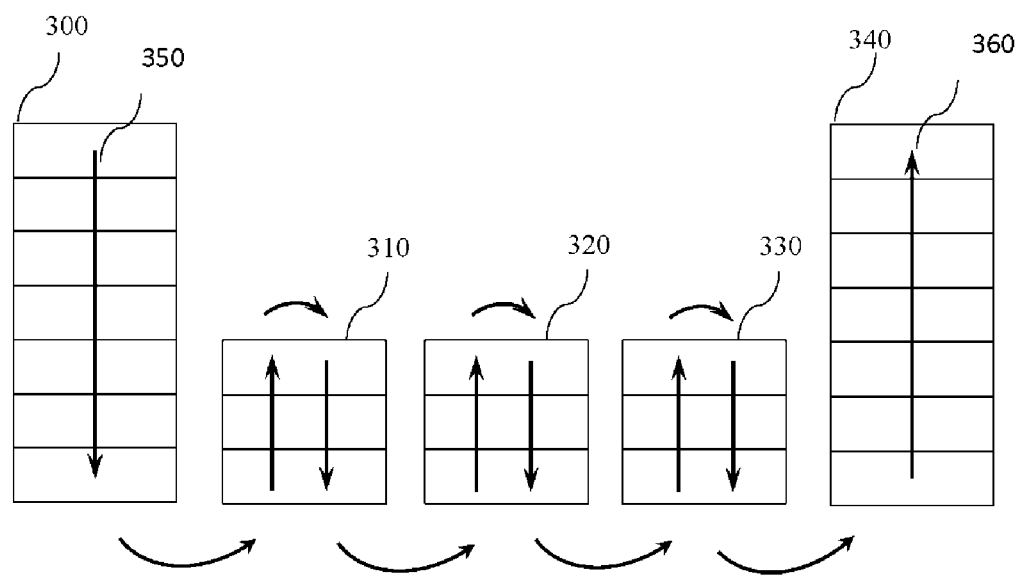
FIG. 3 is a schematic view of a network environment according to a specific embodiment of the present invention.
Figure 4:
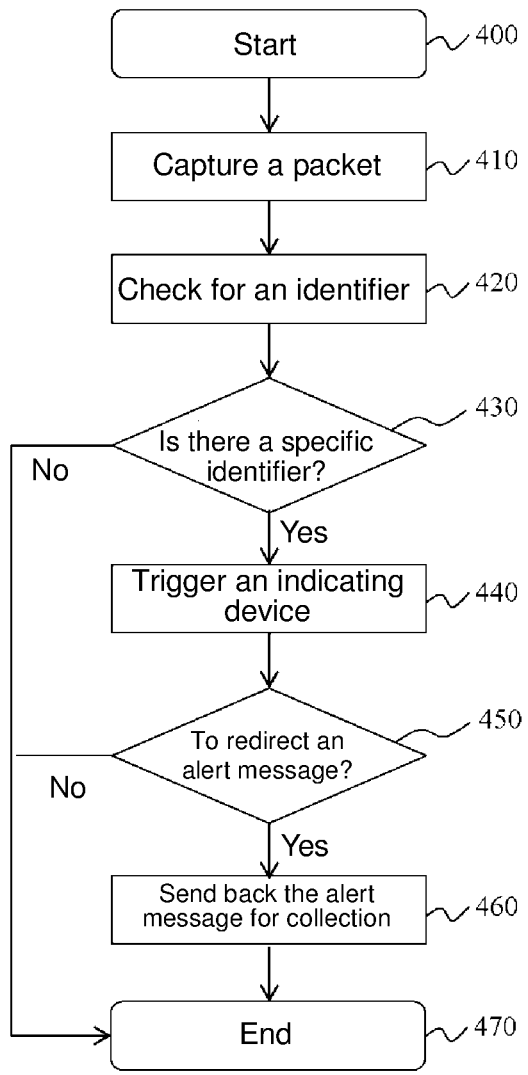
FIG. 4 is a flow chart of a method applicable to a locating module according to a specific embodiment of the present invention.

Referring now to FIG. 3 through FIG. 4, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Hardware Environment System Framework

Figure 2:
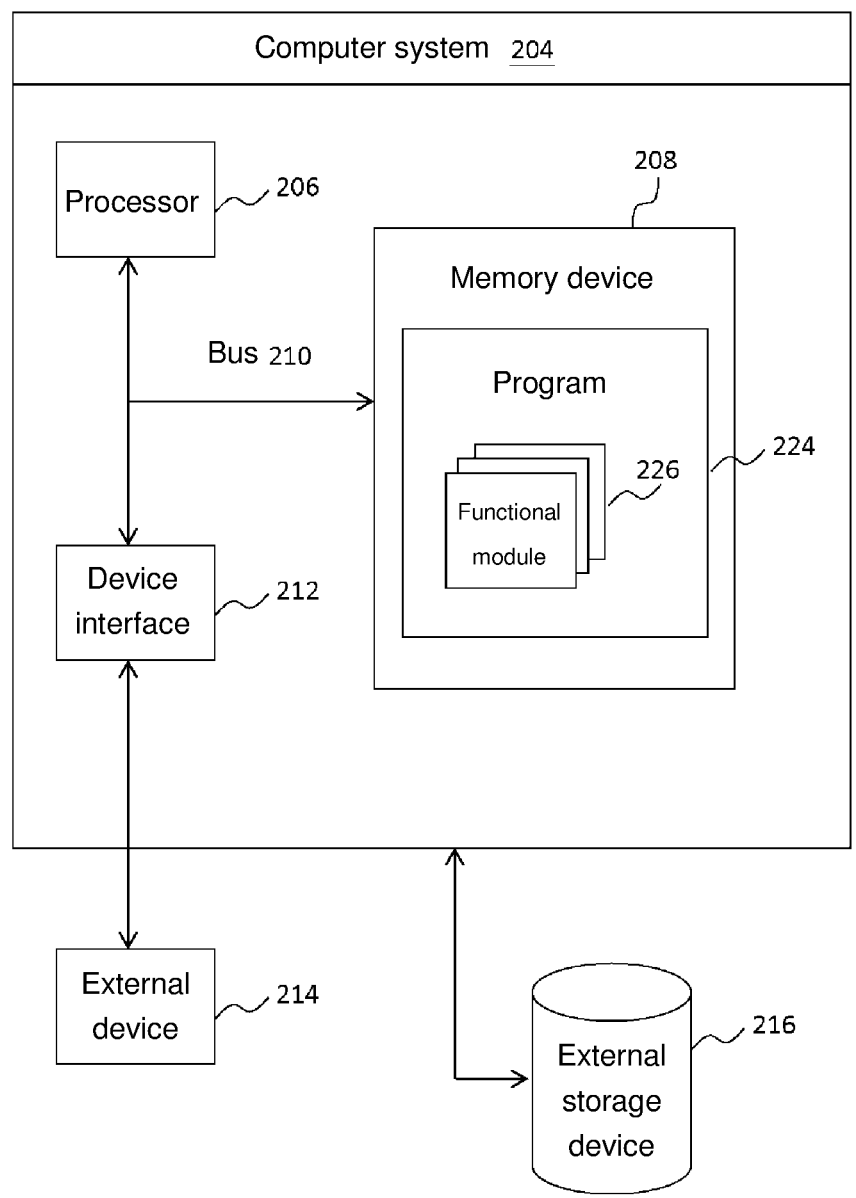
FIG. 2 is a schematic view of the hardware framework of a computer system according to an embodiment of the present invention.

FIG. 2 is a schematic view of the hardware framework of a computer system 204 according to an embodiment of the present invention. The computer system 204 comprises a processor 206, a memory device 208, a bus 210, and a device interface 212. The processor 206 accesses program code, such as a program 224, in the memory device 208 or an external storage device 216. The program 224 has one or more functional modules 226 for providing functions (illustrated with FIG. 4 and described later) required for the present invention, for example, a locating module 400 for locating two endpoint connectors of a network cable. The functional modules 226 each further comprise a sending module for generating and sending an echo request. The locating module 400 comprises a packet capturing module. The functional modules 226 are each a single instruction or a plurality of instructions and are distributed at a plurality of different program code segments, different programs, and a plurality of memory devices 208.

The bus 210 provides a communication link to all components in the computer system 204. The computer system 204 effectuates a communication link to an external device 214 through the device interface 212. The computer system 204 communicates with the external device 214, the external storage device 216, or any other computer device/system through a network.

In this regard, the network can also come in the form of any type of connection, including a wide area network (WAN) or a local area network (LAN) of fixed connection, or dial-up Internet access service offered by an Internet service provider, and it is not restricted to wired or wireless connections. Furthermore, other hardware and software components (not shown, including additional computer systems, routers, and firewalls) can be included in the network.

In another embodiment, from the perspective of its basic architecture and components, the computer system 204 comes in the form of a general-purpose computer device, such as a personal computer, a server, or an appliance, for example. IBM Web Sphere Datapower SOA Appliance or Tivoli ISS Appliances (wherein IBM, WebSphere, and Tivoli are registered trademarks of International Business Machine in the United States and/or any other countries.)

In another embodiment, from the perspective of its basic architecture and components, the computer system 204 comes in the form of a general-purpose computer device, such as a personal computer, a server, or an appliance, as shown in the known prior art.

The present invention further provides a specific mini-appliance or System-on-Card (SoC) which comprises the locating module 400 and thus can be integrated with a cable connector. Hence, the locating module 400 does not compromise the efficiency of sending servers. For a network cable connector integrated with a SoC which comprises the locating module 400.

The SoC is built-in with networking capability and has specific small appliances of a device capable of performing a specific function, similar to known prior art that includes a system-based single-board computer as large as a credit card.

Similarly, the SoC has a processor, a memory, and an input/output (I/O) unit. The input/output (I/O) bus is a high-speed serial bus, such as PCI-e bus, or any other bus structure. The other means of connecting the input/output (I/O) bus includes direct component interconnection and add-on cards. The input/output (I/O) unit is coupled to a hard disk drive, a memory card (such as SD, SDHC, MMC), or a local area network (LAN) adapter. The SoC communicates with any endpoint apparatus through a network and the LAN adapter.

The network can also come in the form of any type of connection, including a wide area network (WAN) or a local area network (LAN) of fixed connection, or dial-up Internet access service offered by an Internet service provider, and it is not restricted to wired or wireless connections. Furthermore, other hardware and software components (not shown, including additional computer systems, routers, and firewalls) can be included in the network.

The memory comprises a random access memory (RAM), a read-only memory (ROM), and an erasable programmable read-only memory (EPROM or flash memory.) The memory stores an operating system and comprises various data and program codes of main applications AP dedicated to the locating module 400, a packet capturing module, and a sending module for generating and sending an echo request. The operating system is executed on a processor to coordinate and provide control of various components in a SoC, and the processor accesses the memory to execute the main applications AP.

A software module or a processing module comprising the locating module 400 is provided in the form of a module in an application or a daemon. In another embodiment, it is provided in the form of a program of the other type. The locating module 400 includes codes of a process illustrated with FIG. 4 and described below.

Persons skilled in the art understand that the hardware of the SoC varies from embodiment to embodiment. The hardware of the SoC can include optionally, or can be replaced with, any other internal hardware or peripheral device, such as a flash read-only memory (Flash ROM), an equivalent non-volatile memory, or a CD-ROM.

According to a specific embodiment of the present invention, a cable integrated with the SoC is provided in the form of a portion of an under-desk network port (such as Ethernet port) or a standalone box of an IP network phone on desktop.

Functional units described herein and in the drawings are illustrated with functional blocks and modules to highlight specifically that the functional units are implemented independently. For example, the functional blocks and modules are implemented to function as hardware circuits, including self-defined VLSI circuit or gate array, such as commercially available semiconductor, transistor, any other discrete components of logical chips. It is also practicable that modules, such as field programmable gate array (FPGA), programmable array logic (PAL), programmable logical device (PLD), or the like, are implemented in a programmable hardware apparatus. It is also practicable that the modules are implemented with software executable by various processors. For example, an identifying module capable of executing a code comprises one or more physical or logical blocks of computer instructions for, for example, organizing the blocks to serve as objects, procedures, or functions. However, executable files of the identifying module are not necessarily stored at the same location physically but each comprises different instructions stored at different locations. When logically coupled together, the instructions each comprise modules and achieve specified purposes of the modules.

An executable code module is a single instruction or a plurality of instructions and is disposed at multiple different program code segments, different programs, and a plurality of memory devices. Likewise, operating data is not only herein identified and described in the modules but also embodied and organized in data structure of any appropriate type by whatever appropriate means. The operating data is collected to form a single data set. Alternatively, the operating data is distributed at different locations (including distributed at different storage apparatuses), and the operating data can only come in the form of an electronic signal that at least partially exists.

The present invention is hereunder further illustrated with embodiments, but persons skilled in the art understand that the embodiments are not restrictive of the present invention.

Sending Module

FIG. 3 is a schematic view of a network environment according to a specific embodiment of the present invention. As shown in the diagram, the network environment exemplarily comprises a sending source server 300, a receiving target server 340, and three routers (310, 320, 330). The sending source server 300 sends a packet 350 carrying therein a specific identifier (such as a predetermined specific bit string). For example, a predetermined specific bit string (such as 0x010f01234) in a residual byte of an ICMP header in a conventional Internet Control Message Protocol (ICMP) packet is configured to function as a specific identifier. Creation of ICMP-based packets is well known among persons skilled in the art and thus is not described herein for the sake of brevity.

Hence, the administrator of the sending source server 300 can send echo request instructions carrying specific identifiers. Before an ICMP packet arrives at the receiving target server 340, network appliances or computer devices comprising the locating module 400, and network cable connectors integrated with the SoC including the locating module 400, all of which are disposed on the route taken by the ICMP packet, trigger, because of the specific identifiers existing in the ICMP packet received, an indicating device indicative of locations of endpoint connectors of a network cable, so as to be identified by the administrator. The indicating device indicates the locations of endpoint connectors of the network cable by light or sound, for example, displaying by flashing or beeping. However, the present invention is not restricted to operating the indicating device by light or sound. Hence, the administrator can identify all the statuses of the indicating device and thus locate a group of linked network cables, thereby managing the computer devices and network appliances easily and effectively.

Locating Module 400

FIG. 4 is a flow chart of a method applicable to a locating module according to a specific embodiment of the present invention. The locating module 400 comprises a program module and instructions for use in locating two endpoint connectors of a network cable. The locating module 400 comprises a packet capturing module. Each computer device, network appliance, and network cable connector integrated with the SoC comprising the locating module 400 comprises an indicating device indicative of locations of endpoint connectors of a network cable and the locating module 400. The process begins at step 405.

Step 410: a packet capturing module captures an incoming packet carrying therein a specific identifier from an echo request instruction. As described above, the packet is an ICMP packet which comprises a predetermined specific bit string (such as 0x010f01234). The capturing step simply involves capturing all the incoming packets for checking and thus simply requires splitting packet signals. The capturing of packets is carried out by the prior art, such as effectuating tcpdump or wireshark to call Libpcab.

Step 420: check the packet for an identifier, for example, by retrieving a bit string configured in a residual byte in a header of an incoming ICMP packet.

Step 430: determine whether the packet carries a specific identifier, for example, by determining whether the header of the ICMP packet comprises the predetermined specific bit string (such as 0x010f01234).

Step 440: if the header of the ICMP packet comprises the predetermined specific bit string (such as 0x010f01234), trigger an indicating device indicative of the locations of endpoint connectors of a network cable to allow the administrator to identify the specific endpoint connectors.

As mentioned before, the indicating device indicates the locations of endpoint connectors of the network cable by light or sound, for example, displaying by flashing or beeping. However, the present invention is not restricted to implementing the indicating device by light or sound.

Step 450: determine whether to redirect an alert message descriptive of the status of the received packet to the sending source server (i.e. sending source server 300 in FIG. 3)

Step 460: if necessary, send back an alert message to allow the sending source server 300 to collect data pertaining to linkage and distribution statuses of locations of endpoint connectors of a network cable of network appliances or computer devices comprising the locating module 400, and network cable connectors integrated with the SoC including the locating module 400, all of which are disposed on the route taken by the ICMP packet, before its arrival at the receiving target server 340. Otherwise, the process flow of the method goes to step 470.

Step 470: end.

Step 450 and step 460 in the locating module 400 are optional steps rather than required steps of the present invention.

Disclosed is a method of locating a network cable connector, and an appliance and a program product implementing the method. The method comprises the following steps: capturing an incoming packet embedded with a specific identifier from an echo request command; checking if the packet comprises the specific identifier; and in response to the existence of the specific identifier in the incoming packet, triggering an indicator device indicating a location of the cable connector for identification.

The present invention provides a simple and effective method and device of locating two endpoint connectors (such as RJ45) of a network cable. All the network appliances disposed on the route taken by a packet sense any packet sent from a sending source server, so as to determine whether the packet carries therein a specific identifier (such as a predetermined bit string.) If the specific identifier is present in the received packet, an indicating device indicative of locations of endpoint connectors of a network cable is triggered. For example, the locations of endpoint connectors of the network cable are indicated by light or sound, thereby allowing an administrator to identify the status of the indicating device easily and effectively. Hence, the administrator checks all the statuses of the indicating device by sending instructions or signals (for example, sending an echo request instruction carrying a specific identifier), so as to locate a group of linked network cables.

In an embodiment, a method of locating endpoint connectors of a network cable is provided. The method includes the steps of: capturing an incoming packet carrying therein a specific identifier from an echo request instruction; checking whether the incoming packet carries therein the specific identifier; and triggering an indicating device indicative of locations of endpoint connectors of a network cable for identification in response to the incoming packet received carrying therein the specific identifier.

In another embodiment, a computer program product includes a computer-readable medium having therein a stored program code executable on an appliance to implement the method as mentioned above, thereby locating endpoint connectors of a network cable.

In another embodiment, an appliance is disclosed. The appliance includes: a bus; a memory connected to the bus, wherein the memory comprises a set of instructions; and a processing unit connected to the bus, wherein the processing unit executes the set of instructions, so as to execute the method as mentioned above, thereby locating endpoint connectors of a network cable.

In another embodiment, a network cable connector integrated into an appliance is disclosed. The appliance includes: a bus; a memory connected to the bus, wherein the memory comprises a set of instructions; and a processing unit connected to the bus, wherein the processing unit executes the set of instructions, so as to execute the method as mentioned above, thereby locating endpoint connectors of a network cable.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of locating one or more endpoint connectors of a network cable, wherein the network cable includes a first endpoint connector and a second endpoint connector, the method comprising:
    capturing, by one or more processors, an incoming packet carrying therein a specific identifier, wherein the specific identifier is a specific bit string that has been predefined to trigger an activation of one or more indicating devices located on one or more endpoint connectors on the network cable;
    determining, by the one or more processors, that the incoming packet carries therein the specific identifier; and
    in response to determining that the incoming packet carries therein the specific identifier, triggering, by the one or more processors, an activation of a first indicating device indicative of a location of the first endpoint connector.

2. The method of claim 1, further comprising:
    in response to determining that the incoming packet carries therein the specific identifier, triggering, by the one or more processors, an activation of a second indicating device indicative of a location of the second endpoint connector.

3. The method of claim 2, wherein the first and second indicating devices indicate locations of the one or more endpoint connectors of the network cable by a visual signal.

4. The method of claim 2, wherein the first and second indicating devices indicate locations of the one or more endpoint connectors of the network cable by an aural signal.

5. The method of claim 1, further comprising:
redirecting, by the one or more processors, an alert message descriptive of a status of the incoming packet to a source sending end of the incoming packet, wherein said redirecting the alert message causes the source sending end to collect data pertaining to linkage and distribution statuses of locations of endpoint connectors of all computer devices and network appliances disposed on a route taken by the incoming packet bound for a target receiving end.

6. The method of claim 1, wherein the incoming packet is created and based on Internet Control Message Protocol (ICMP) and sent from a source sending end by an echo request instruction.

7. The method of claim 1, wherein the specific bit string is a multiple bit string.

8. The method of claim 1, wherein the incoming packet traverses from a sending source server to a receiving target server via multiple intermediate routers that are interconnected by multiple cables, and wherein the method further comprises:
in response to determining that the incoming packet received by each of the multiple intermediate routers carries therein the specific identifier, triggering indicating devices on endpoints of each of the multiple cables that interconnect the multiple intermediate routers.

9. A computer program product for locating one or more endpoint connectors of a network cable, wherein the network cable includes a first endpoint connector and a second endpoint connector, the computer program product comprising a computer readable storage medium having program code embodied therewith, wherein the computer readable storage medium is not a transitory signal per se, and wherein the program code is readable and executable by a processor to perform a method comprising:
capturing an incoming packet carrying therein a specific identifier, wherein the specific identifier is a specific bit string that has been predefined to trigger an activation of one or more indicating devices located on one or more endpoint connectors on the network cable;
determining that the incoming packet carries therein the specific identifier; and
in response to determining that the incoming packet carries therein the specific identifier, triggering an activation of a first indicating device indicative of a location of the first endpoint connector.

10. The computer program product of claim 9, wherein the method further comprises:
in response to determining that the incoming packet carries therein the specific identifier, triggering an activation of a second indicating device indicative of a location of the second endpoint connector.

11. The computer program product of claim 10, wherein the first and second indicating devices indicate locations of the one or more endpoint connectors of the network cable by a visual signal.

12. The computer program product of claim 10, wherein the first and second indicating devices indicate locations of the one or more endpoint connectors of the network cable by an aural signal.

13. The computer program product of claim 9, wherein the method further comprises:
redirecting an alert message descriptive of a status of the incoming packet to a source sending end of the incoming packet, wherein said redirecting the alert message causes the source sending end to collect data pertaining to linkage and distribution statuses of locations of endpoint connectors of all computer devices and network appliances disposed on a route taken by the incoming packet bound for a target receiving end.

14. The computer program product of claim 9, wherein the incoming packet is created and based on Internet Control Message Protocol (ICMP) and sent from a source sending end by an echo request instruction.

15. The computer program product of claim 9, wherein the specific bit string is a multiple bit string.

16. The computer program product of claim 9, wherein the incoming packet traverses from a sending source server to a receiving target server via multiple intermediate routers that are interconnected by multiple cables, and wherein the method further comprises:
in response to determining that the incoming packet received by each of the multiple intermediate routers carries therein the specific identifier, triggering indicating devices on endpoints of each of the multiple cables that interconnect the multiple intermediate routers.

17. A hardware device for locating one or more endpoint connectors of a network cable, wherein the network cable includes a first endpoint connector and a second endpoint connector, the hardware device comprising:
a packet capturing hardware device configured to capture an incoming packet carrying therein a specific identifier, wherein the specific identifier is a multiple bit string in the incoming packet;
a packet examination logic configured to determine whether the incoming packet carries therein the specific identifier; and
a first indicating device configured to indicate, in response to determining that the incoming packet carries therein the specific identifier, a physical location of the first endpoint connector of the network cable.

18. The hardware device of claim 17, further comprising:
a second indicating device configured to indicate, in response to determining that the incoming packet carries therein the specific identifier, a physical location of the second endpoint connector.

19. The hardware device of claim 17, further comprising:
an alert message redirecting hardware device configured to redirect an alert message descriptive of a status of the incoming packet to a source sending end of the incoming packet, wherein redirecting the alert message causes the source sending end to collect data pertaining to linkage and distribution statuses of locations of endpoint connectors of all computer devices and network appliances disposed on a route taken by the incoming packet bound for a target receiving end.

20. The hardware device of claim 17, wherein the hardware device is a System-on-Card (SoC) that is integrated within the network cable.

* * * * *